(12) United States Patent
Ruth et al.

(10) Patent No.: US 8,370,335 B2
(45) Date of Patent: Feb. 5, 2013

(54) MULTIPLE FIELD LOOK AHEAD AND VALUE HELP

(75) Inventors: Ralf Ruth, Mauer (DE); Uwe Klinger, Bad Schoenborn (DE)

(73) Assignee: SAP AG, Walldorf (DE)

( * ) Notice: Subject to any disclaimer, the term of this patent is extended or adjusted under 35 U.S.C. 154(b) by 968 days.

(21) Appl. No.: 11/952,926

(22) Filed: Dec. 7, 2007

(65) Prior Publication Data

US 2009/0150434 A1    Jun. 11, 2009

(51) Int. Cl.
*G06F 17/00* (2006.01)

(52) U.S. Cl. ........ 707/723; 707/706; 707/735; 707/737; 707/769

(58) Field of Classification Search .................. 707/706, 707/715, 723, 735, 737, 769
See application file for complete search history.

(56) References Cited

U.S. PATENT DOCUMENTS

| | | | |
|---|---|---|---|
| 7,548,915 B2* | 6/2009 | Ramer et al. | 705/14.54 |
| 7,840,970 B2* | 11/2010 | Liang | 719/329 |
| 2008/0059949 A1* | 3/2008 | Matic | 717/108 |
| 2008/0133303 A1* | 6/2008 | Singh et al. | 705/8 |

* cited by examiner

*Primary Examiner* — Sana Al Hashemi
(74) *Attorney, Agent, or Firm* — Mintz Levin Cohn Ferris Glovsky and Popeo, P.C.

(57) ABSTRACT

Methods and apparatus, including computer program products, are provided for providing value help. In one aspect, there is provided a computer-implemented method. The method may include receiving, from a user interface, an input. Based on the received input, one or more fields may be determined from a plurality of columns of a table of a database. The determined one or more fields may be provided to the user interface for presentation as a value help to the input being presented at the user interface. Related apparatus, systems, methods, and articles are also described.

20 Claims, 6 Drawing Sheets

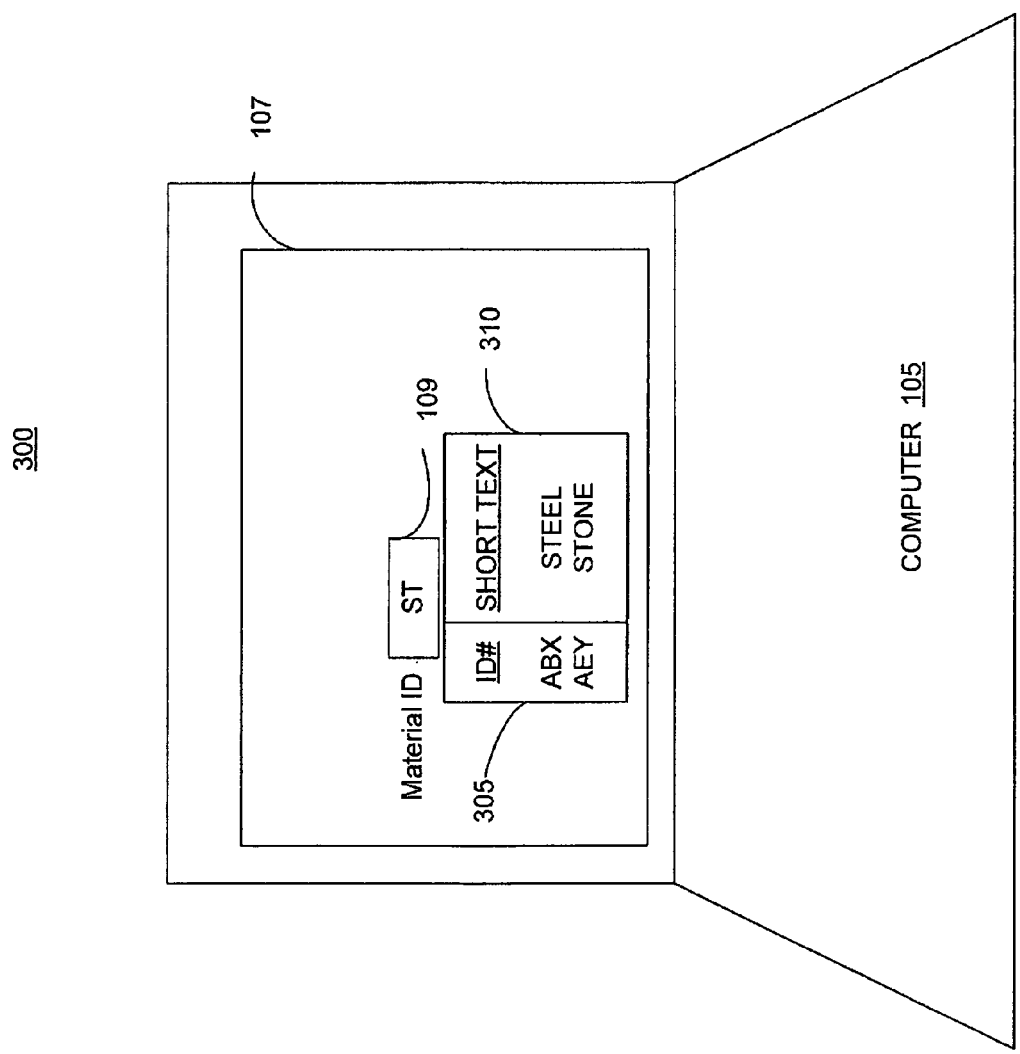

MULTIPLE FIELD LOOK AHEAD AND VALUE HELP

FIELD

The present disclosure generally relates to providing value help to a user interface.

BACKGROUND

ABAP (Advanced Business Application Programming) is a high-level programming language available from SAP AG, Walldorf, Germany. ABAP may be used to provide business applications. ABAP code usually does not run directly on a client, but on an application server, such as a database, application server, application, and the like. The client may include a user interface, such as a browser, to access the database, application server, application, and the like.

When a user at a user interface accesses the application server or the database, the user may input a value at the user interface. For example, to complete a flight reservation, the user may input a city. Moreover, the user may select a value help function to obtain value help, i.e., help information for the value being entered at the user interface. Referring to the flight reservation system example, the user may select function F4 to invoke value help. When this is the case, as a user types in the letter D in an input for city, a list of cites, such as Denver, Detroit, Dansville, is provided as a value help drop down list. If the user enters a second value "a," the list may be filtered to all cities starting with "DA," and so forth as additional values are input. If a user selects a city in the drop down list, the selected city from the drop down list becomes the input at the user interface.

SUMMARY

The subject matter disclosed herein provides methods and apparatus, including computer program products, for providing value help from multiple fields.

In one aspect, there is provided a computer-implemented method. The method may include receiving, from a user interface, an input. Based on the received input, one or more fields may be determined from a plurality of columns of a table of a database. The determined one or more fields may be provided to the user interface for presentation as a value help to the input being presented at the user interface.

The subject matter described herein may be implemented to realize the advantage of providing enhanced help information including information from a plurality of columns of a table of a database.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

In the drawings,

FIG. 3 depicts a user interface including value help; and

Figure 1:
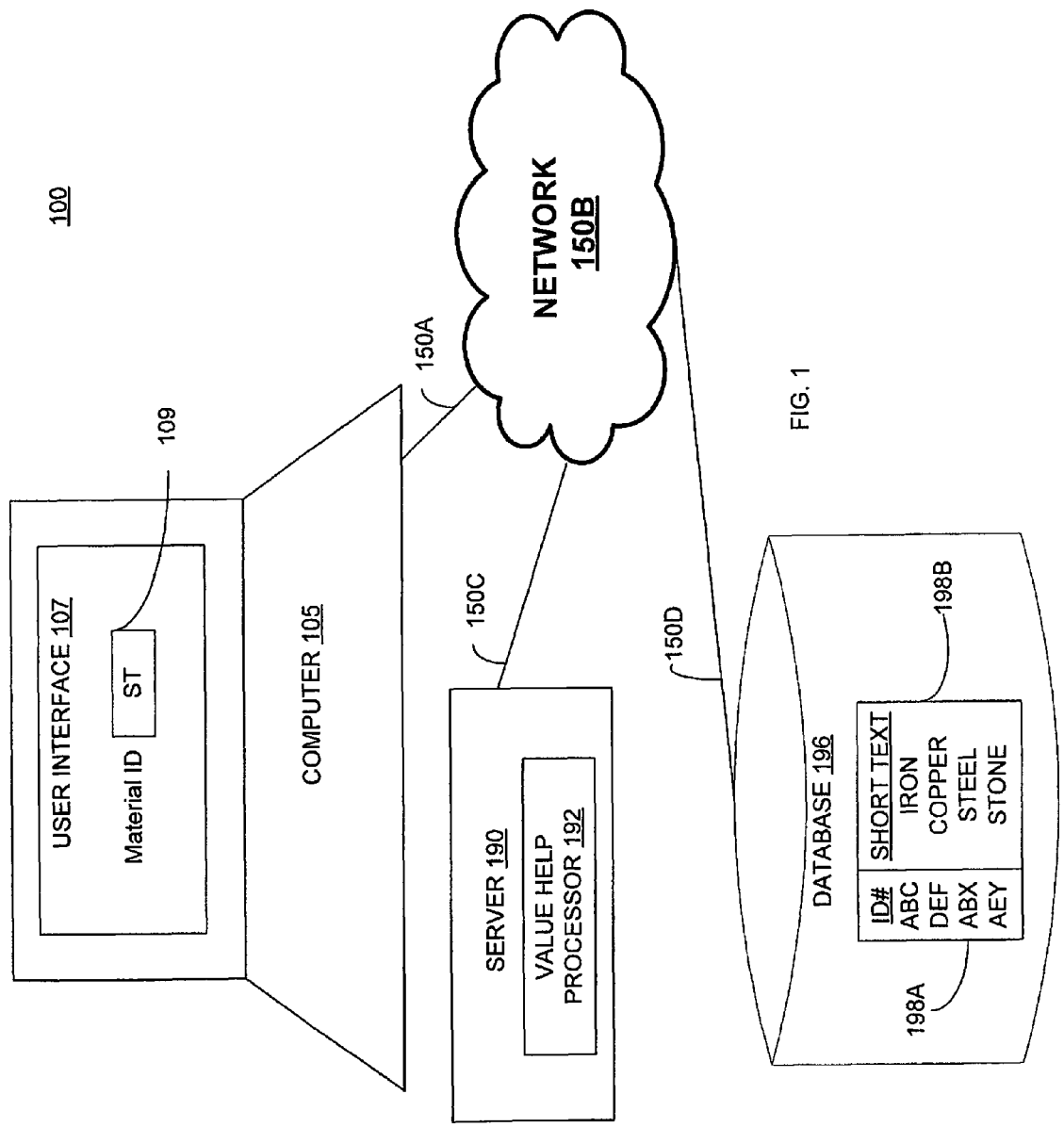
FIG. 1 depicts a block diagram of a system 100 for providing value help to a user interface.

Like labels are used to refer to same or similar items in the drawings.

DETAILED DESCRIPTION

FIG. 1 depicts a system 100 including a computer 105, a server 190, and a database 196, all of which are coupled by a network 150A-D. Computer 105 further includes a user interface 107. Server 190 further includes a value help processor 192.

Computer 105 may be implemented as any processor capable of executing (i.e., running) an application, such as a user interface 107.

User interface 107 may be implemented as any type of interface that enables interaction with aspects of system 100, including server 190, value help processor 192, and database 196. User interface 107 may be implemented as a browser (e.g., Netscape Navigator), an interface implemented using Web Dynpro technology (available from SAP AG, Walldorf, Germany)), and the like. For example, user interface 107 may interact with a system for processing purchase orders including information from database 196.

User interface 107 may include one or more elements, such as buttons, icons, and inputs. FIG. 1 depicts user interface including an input 109. In the example shown, the input is used to provide a material identifier (ID) for a purchase order, The material ID may be stored at database 196. The material ID represents a short hand code for the material. The material ID does not provide any semantic information regarding the type of material associated with the ID.

Server 190 may be implemented as one or more processors, computers, blades, or any other processor capable of executing (i.e., running) an application, such as value help processor 192.

Value help processor 192 may be implemented as an application and may include an application-programming interface (API). When the API of value help processor is called, value help processor 192 may determine one or more fields as value help for an input 109. Moreover, value help processor 192 may provide the one or more values as value help even without receiving an indication of a request for value help (e.g., a user selecting F4). For example, as input 109 receives values, value help processor 192 may provide value help. Value help represents possible values for input 109. Moreover, the one or more fields provided by value help processor 192 as value help may be from a plurality of columns of database 196. Moreover, these columns may include columns other than the material ID column of a table at database 196.

Although value help processor 192 is depicted as separate from database 196 and computer 105, in some implementations, value help processor 192 may be implemented in other locations, including at database 196 and computer 105.

Database 196 may be implemented as any type of database. In some implementations, database 196 may include ABAP (Advanced Business Application Programming). Database 196 may include one or more tables, such as a table including columns 198a-b. Although the table of database 196 includes only two columns, the table may include any number of columns as well.

Network 150A-D may be any type of communications mechanism and may include, alone or in any suitable combination, intra-process communications, the Internet, an intranet, or any other communication mechanism (e.g., a telephony-based network, a local area network (LAN), a wide area network (WAN), a dedicated intranet, a wireless network, and a bus). Moreover, network 150A-D may be embodied using bi-directional, unidirectional, or dedicated communication links. Network 150A-D may also support standard transmission protocols, such as Transmission Control Protocol/Internet Protocol (TCP/IP), Hyper Text Transfer Protocol (HTTP), SOAP, WS-RM, RPC, or other protocols.

Figure 2:
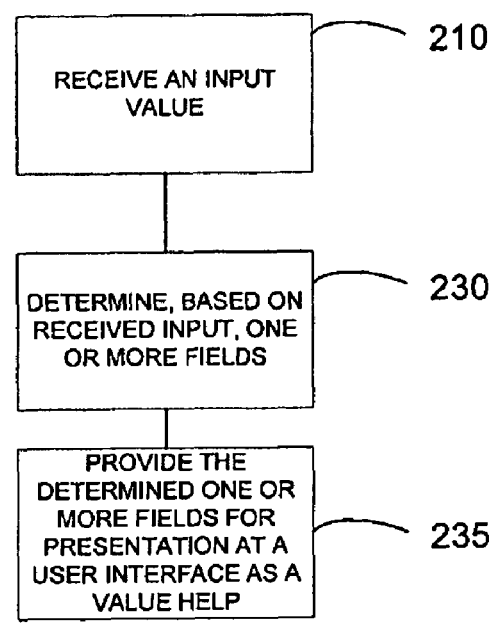
FIG. 2 depicts a process 200 for providing value help.

FIG. 2 depicts a process 200 for providing value help.

At 210, an input is received. For example, value help processor 192 may receive one or more values provided at input 109. For example, as the value ST is entered at 109, value help processor 192 may receive one or more of the values S and T.

At 230, one or more fields may be determined. In some implementations, value help processor 192 may determine one or more fields from database 196. These one or more fields may be determined based on the input values received at 210. Moreover, value help processor 192 may determine one or more fields corresponding to a plurality of columns in database 196. Moreover, these columns may include columns other than the column corresponding to input 109. For example, value help processor 192 may search for ST in all the columns of a table of database 196 regardless of whether the column corresponds to input 109, which in this example is material ID. Although the above example describes using database tables, the value help processor 192 may be used with other types of data (e.g., e.g. a central index, such as an index of all data of database tables). Moreover, the received input of 210 may include contextual information regarding an application (e.g., user interface 107, database 196, and the like) to determine valid values (e.g., fields) from the set of all existing values to provide value help (e.g., by providing a predefined where condition of a select statement).

For example, the input ST 109 received at 210 may be used by value help processor 192 to determine one or more fields as value help at user interface 107. Value help processor 192 may perform a search across all of the columns of the tables of database 196 rather than search a single column. For example, a SELECT command may search across all of the columns of database 196 (i.e., SELECT from database 196, where columns include "ST"). In the example of FIG. 2, value help processor 192 would determine "ABX STEEL" and "AEY STONE" as the one or more fields to provide as value help to user interface 107 even though input 109 corresponds to material ID. As such, even though a user provides material type information in input 109 rather than material ID at input 109, value help processor 192 determines, based on the values "ST," value help information from among a plurality of columns of database 196.

In some implementations, the columns 198A-B may be included in a dictionary or a search index to enable value help processor 192 to determine the one or more fields at 230. In some implementations, the following commands are used by value help processor 192:

SELECT from material
where, ID like "ST %" OR "SHORT TEXT" like "ST %".

In some implementations, value help processor 192 may limit the number of fields it provides (e.g., not to exceed 50 fields), although any number of fields may be provided to user interface 107 as well (e.g., an indexing service, such as SAP TREX).

At 235, value help processor 192 provides the determined one or more fields. The one or more determined fields may be provided to enable user interface 107 to provide help to values (i.e., value help) being input 109. Value help processor 192 may send through network 150A-C a message including the one or more determined fields to user interface 107. When a user selects "STEEL" from the value help, input 109 would include material ID "ABX" rather than "STEEL."

Figure 4A:
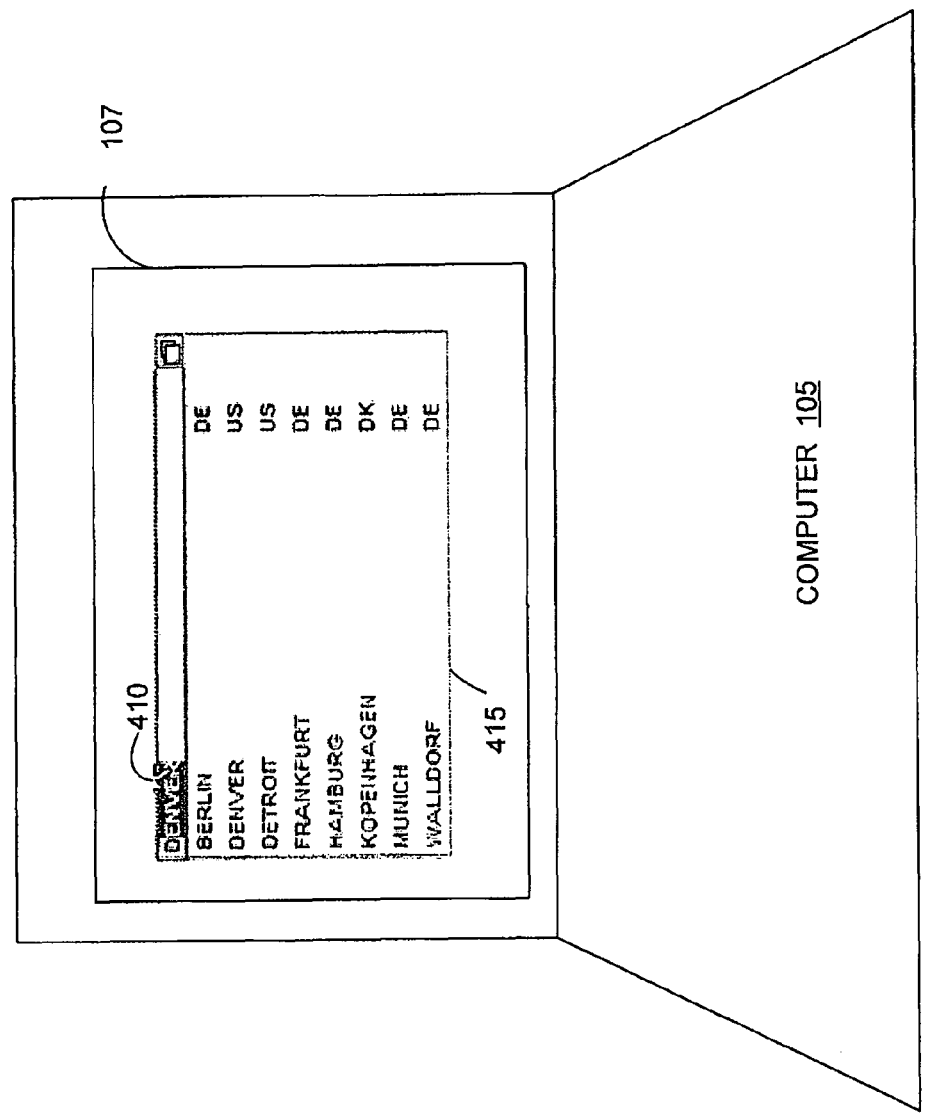
FIGS. 4A, 4B, and 4C depict other examples of user interfaces including value help.

FIG. 3 depicts user interface 107 after process 200 provides the one or more fields as value help. Specifically, as the input ST is entered 109, value help processor 192 provides value help 305 and 310. Value help 310 represents materials STEEL and STONE, both of which start with "ST." User interface 107 may then select any of the fields STEEL, STONE, ABX, and AEY as input to 109. For example, a user of user interface 107 may not know the material IDs for different types of materials. Instead, a user of user interface 107 provides another aspect, such as ST corresponding to material type. Value help processor 192 then performs process 200—searching for "ST" across all columns of database 196, such as a column for material ID and a column identifying the material type—to provide one or more fields as value help 305 and 310. [031] FIG. 4A depicts user interface 107 after process 200 provides one or more fields 415 as value help based on an input 410. Specifically, as the input D is entered, value help processor 192 receives that value, determines one or more fields, and provides value help 415 using process 200. The value help 415 includes one or more fields from different columns, namely the city column (e.g., Berlin, Denver, and the like) and the country column (e.g., DE, US, DK, and the like).

Figure 4B:
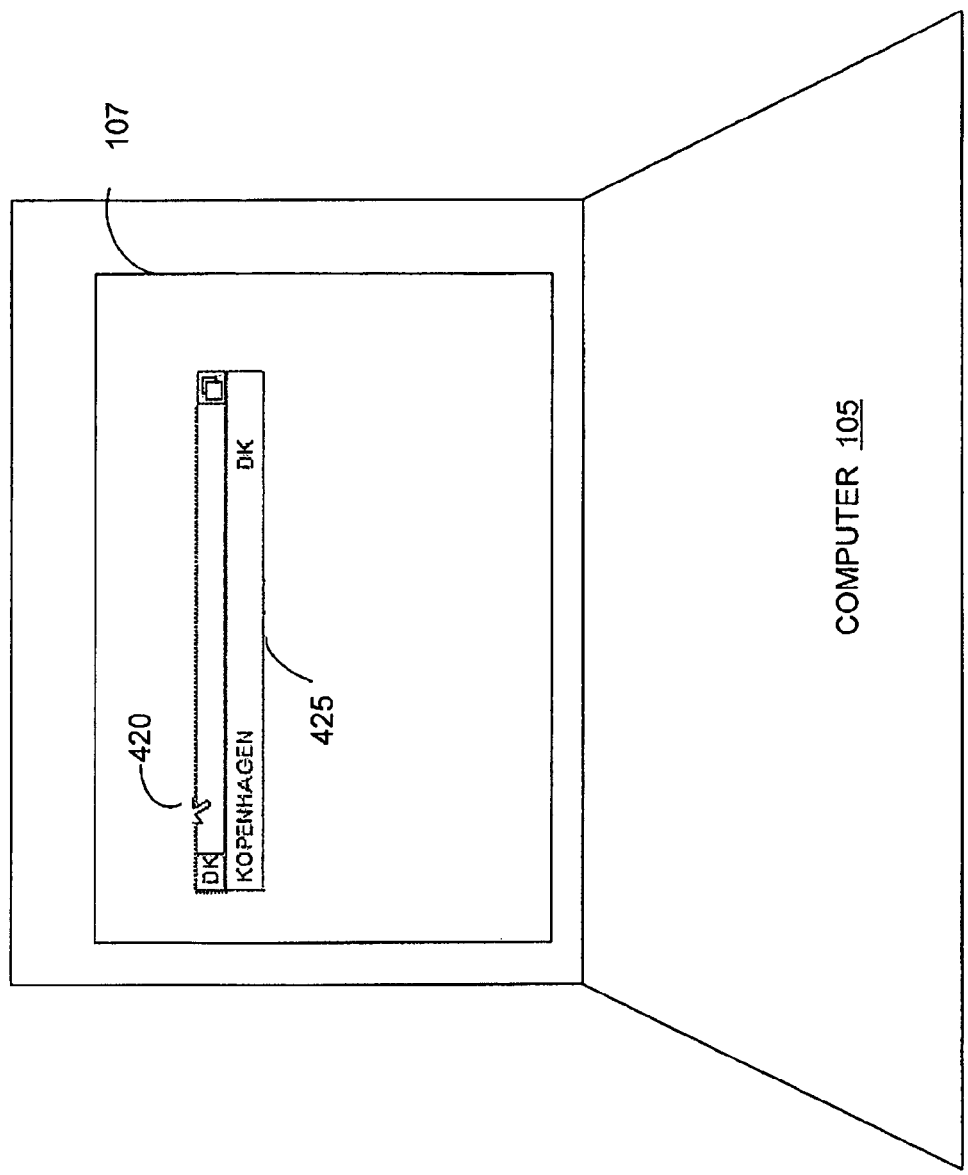

FIG. 4B depicts the user interface of FIG. 4A after a second value K 420 is input. Specifically, as the input K 420 is entered, value help processor 192 receives that value, determines, based on the value "DK" one or more fields, and provides value help 425 using process 200. The value help 425 includes one or more fields from different columns, namely the city column (e.g., Kopenhagen) and the country column (e.g., DK).

Figure 4C:
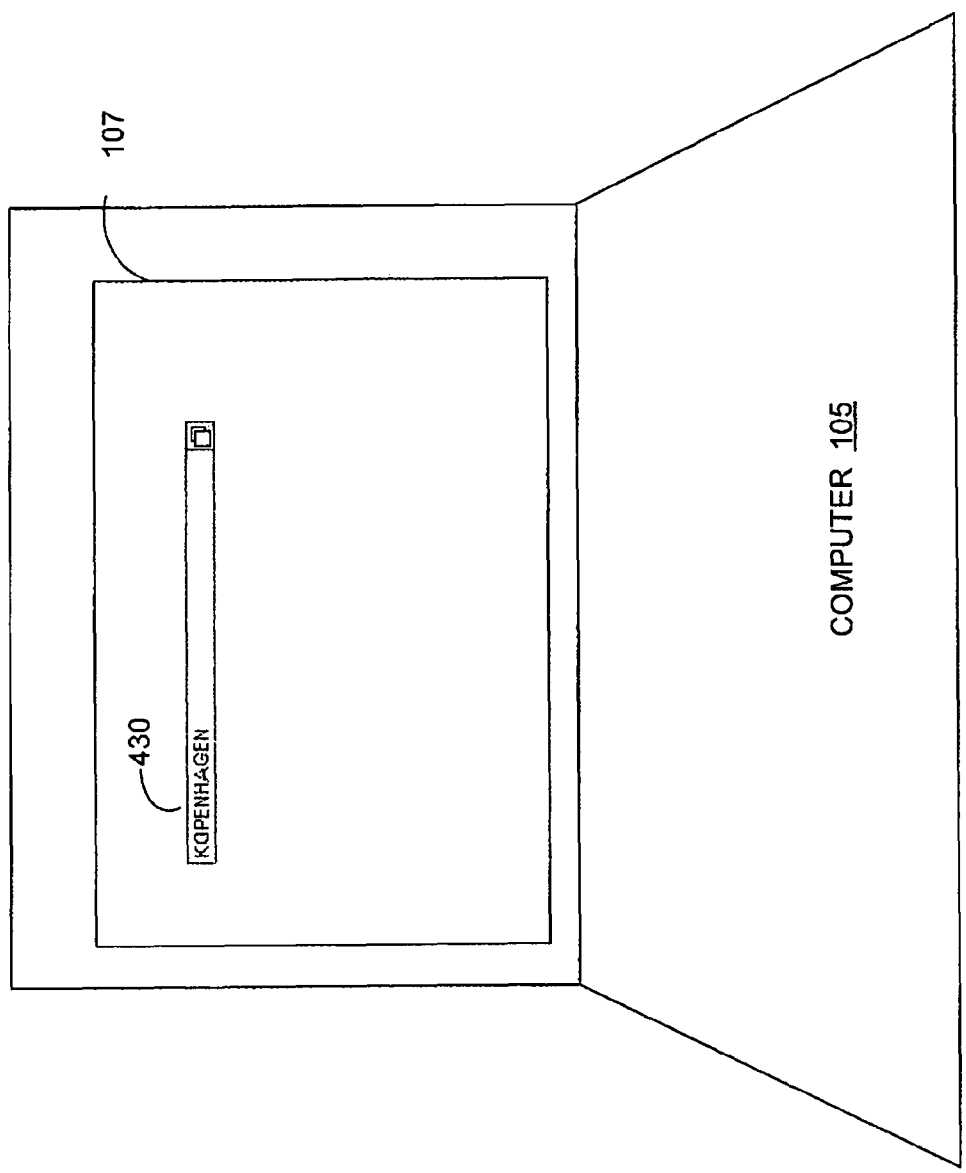

FIG. 4C depicts user interface 107 after value help 425 is selected. Although the input 430 requires a city as an input value, value help processor 192 provides value help based on whatever was input, such as the country "DK." Consequently, value help processor 192 provides enhanced value help when compared to traditional value help mechanisms that would only provide value help for a specific column of a database. In the case of FIGS. 4A-C, a traditional approach would require the user to provide "K" for the city of Kopenhagen rather than "DK" for the country as input at 410 and 420.

In some implementations, value help processor 192 may provide the value help for presentation at user interface 107. The value help may be provided in the same window as the input. Referring to FIG. 4A, input 410 and value help 415 are depicted in the same window, with the value help 415 being a drop down list. Although FIG. 4A depicts value help 415 and input 410 in the same window, value help 415 and input 410 may be in separate windows as well. Moreover, although value help 415 is depicted as a drop down list at FIG. 4A, value help 415 may be presented by user interface 107 in other ways, too.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed:

1. A non-transitory computer-readable medium containing instructions to configure a processor to perform a method, the method comprising:
    receiving, from a user interface, a partial entry comprising one or more keyboard characters;
    determining, based on the received partial entry, one or more first values determined by at least partially matching the partial entry to the one or more first values, the one or more first values coming from a plurality of columns of a table of a database; and
    providing based on the determined one or more first values matched to the partial entry, one or more second values associated with the one or more first values, the one or more second values being from different columns than the one or more first values, the one or more second values being value help.

2. The non-transitory computer-readable medium of claim 1, wherein receiving further comprises:
    receiving, from the user interface and a network, a message including the partial entry.

3. The non-transitory computer-readable medium of claim 1, wherein determining further comprises:
    selecting from the plurality of columns the one or more first vales, the plurality of columns corresponding to one or more tables of the database implemented using Advanced Business Application Programming (ABAP).

4. The non-transitory computer-readable medium of claim 3, wherein selecting further comprises:
    using a select command to select the one or more first values from the plurality of columns, the selection based on the partial entry.

5. The non-transitory computer-readable medium of claim 1, wherein determining further comprises:
    generating an index from the plurality of columns.

6. The non-transitory computer-readable medium of claim 5 further comprising:
    selecting the one or more first values from the generated index.

7. The non-transitory computer-readable medium of claim 1, wherein determining further comprises:
    determining the one or more first values without an indication at the user interface indicating that value help is requested.

8. The non-transitory computer-readable medium of claim 1, wherein providing further comprises:
    presenting at a window the input and presenting at the window the one or more second values as the value help.

9. The non-transitory computer-readable medium of claim 1 further comprising:
    selecting, at the user interface, one of the one or more first values; and
    inserting one of the one or more second values associated with the one of the one or more first values into the partial entry at the user interface.

10. A method comprising:
    receiving, from a user interface, a partial entry comprising one or more keyboard characters;
    determining, based on the received partial entry, one or more first values determined by at least partially matching the partial entry to the one or more
    first values, the one or more first values coming from a plurality of columns of a table of a database; and
    providing, based on the determined one or more first values matched to the partial entry, one or more second values associated with the one or more first values, the one or more second values being from different columns than the one or more first values, the one or more second values being value help, wherein at least one of the receiving, the determining, and the providing are implemented on at least one processor.

11. The method of claim 10, wherein receiving further comprises:
    receiving, from the user interface and a network, a message including the partial entry.

12. The method of claim 10, wherein determining further comprises:
    selecting from the plurality of columns the one or more first values, the plurality of columns corresponding to one or more tables of the database implemented using Advanced Business Application Programming (ABAP).

13. The method of claim 12, wherein selecting further comprises:
    using a select command to select the one or more first values from the plurality of columns, the selection based on the partial entry.

14. The method of claim 10, wherein determining further comprises:
    generating an index from the plurality of columns.

15. The method of claim 14 further comprising:
    selecting the one or more first values from the generated index.

16. The method of claim 10, wherein determining further comprises:
    determining the one or more first values without an indication at the user interface indicating that value help is requested.

17. The method of claim 10, wherein providing further comprises:
    presenting at a window the partial entry and presenting at the window the one or more first values and the one or more second values as the value help;
    selecting, at the user interface, one of a the one or more first values; and inserting one of the one or more second values associated with the one of the one or more first values into the partial entry at the user interface.

18. A system comprising:
a processor; and
a memory, wherein the processor and the memory are configured to perform a method comprising:
receiving, from a user interface a partial entry comprising one or more keyboard characters;
determining, based on the received partial entry, one or more first values determined by at least partially matching the partial entry to the one or more first values, the one or more first values coming from a plurality of columns of a table of a database; and
providing, based on the determined one or more first values matched to the partial entry, one or more second values associated with the one or more first values, the one or more second values being from different columns than the one or more first values, the one or more second values being value help.

19. The system of claim 18, wherein receiving further comprises:
receiving, from the user interface and a network, a message including the partial entry.

20. The system of claim 18, wherein determining further comprises:
selecting from the plurality of columns the one or more first values, the plurality of columns corresponding to one or more tables of the database implemented using Advanced Business Application Programming (ABAP).

* * * * *